US012147176B2

(12) United States Patent
Yamashita

(10) Patent No.: US 12,147,176 B2
(45) Date of Patent: Nov. 19, 2024

(54) IMAGE FORMING APPARATUS

(71) Applicant: FUJIFILM BUSINESS INNOVATION CORP., Tokyo (JP)

(72) Inventor: Takayuki Yamashita, Ebina (JP)

(73) Assignee: FUJIFILM BUSINESS INNOVATION CORP., Tokyo (JP)

(*) Notice: Subject to any disclaimer, the term of this patent is extended or adjusted under 35 U.S.C. 154(b) by 0 days.

(21) Appl. No.: 18/147,387

(22) Filed: Dec. 28, 2022

(65) Prior Publication Data

US 2023/0139544 A1 May 4, 2023

Related U.S. Application Data

(63) Continuation of application No. PCT/JP2021/027605, filed on Jul. 26, 2021.

(30) Foreign Application Priority Data

Sep. 16, 2020 (JP) ................................ 2020-155743

(51) Int. Cl.
*G03G 15/20* (2006.01)

(52) U.S. Cl.
CPC ................................ *G03G 15/2028* (2013.01)

(58) Field of Classification Search
CPC .................................................. G03G 15/2028
See application file for complete search history.

(56) References Cited

U.S. PATENT DOCUMENTS 5,053,826 A * 10/1991 Castelli .............. G03G 15/0131 271/204
2006/0056886 A1* 3/2006 Ohishi .................. B41J 13/025 399/328
2012/0087687 A1* 4/2012 Moteki ............... G03G 15/657 399/68
2013/0027492 A1 1/2013 Yoneyama et al.
(Continued)

FOREIGN PATENT DOCUMENTS

JP 2002-148973 A 5/2002
JP 2003-195586 A 7/2003
(Continued)

OTHER PUBLICATIONS

Machine translation of Miyagawa.*
(Continued)

*Primary Examiner* — Sevan A Aydin
(74) *Attorney, Agent, or Firm* — Oliff PLC

(57) ABSTRACT

An image forming apparatus includes: an image forming part that forms an image at an image formation position on one surface of a recording medium; a transport part that transports the recording medium while holding a front end side of the recording medium so that the recording medium passes the image formation position; a transport body that transports the recording medium together with the transport part while supporting the other surface of the recording medium on which an image is to be formed by the image forming part; and a support part that supports the other surface of the recording medium, and the support part starts the support before the other surface of the recording medium is separated from the transport body as a result of transport by the transport part.

4 Claims, 10 Drawing Sheets

(56) References Cited

U.S. PATENT DOCUMENTS

| | | | | |
|---|---|---|---|---|
| 2017/0266988 | A1 | 9/2017 | Asada et al. | |
| 2018/0264725 | A1 | 9/2018 | Swartz et al. | |
| 2020/0290383 | A1* | 9/2020 | Ishihara | G03G 15/2021 |
| 2021/0286304 | A1 | 9/2021 | Shimodaira et al. | |
| 2021/0364965 | A1* | 11/2021 | Matsui | G03G 15/657 |
| 2022/0075300 | A1 | 3/2022 | Kodera et al. | |
| 2022/0113659 | A1* | 4/2022 | Miyagawa | G03G 15/2007 |

FOREIGN PATENT DOCUMENTS

| | | | | |
|---|---|---|---|---|
| JP | 2008-070554 | A | | 3/2008 |
| JP | 2011-175064 | A | | 9/2011 |
| JP | 2011-186197 | A | | 9/2011 |
| JP | 2013-107760 | A | | 6/2013 |
| JP | 2020-134929 | A | | 8/2020 |
| JP | 2021-015268 | A | | 2/2021 |
| JP | 2021050096 | A | * | 4/2021 |
| WO | WO-2021053894 | A1 | * | 3/2021 |

OTHER PUBLICATIONS

Machine translation of Miyakawa.*

Oct. 18, 2023 Office Action issued in Australian Patent Application No. 2021344023.

Oct. 31, 2023 Office Action issued in Japanese Patent Application No. 2022-550393.

Aug. 1, 2023 Office Action issued in Japanese Patent Application No. 2022-550393.

Sep. 7, 2021 Search Report issued in International Patent Application No. PCT/JP2021/027605.

Sep. 7, 2021 Written Opinion issued in International Patent Application No. PCT/JP2021/027605.

Aug. 28, 2024 Extended European Search Report issued in European Patent Application No. 21869038.6.

Sep. 24, 2024 Office Action issued in Japanese Patent Application No. 2024-012006.

* cited by examiner

IMAGE FORMING APPARATUS

CROSS-REFERENCE TO RELATED APPLICATIONS

This is a continuation of International Application No. PCT/JP2021/27605 filed on Jul. 26, 2021, and claims priority from Japanese Patent Application No. 2020-155743 filed on Sep. 16, 2020.

BACKGROUND

(i) Technical Field

The present disclosure relates to an image forming apparatus.

(ii) Related Art

Japanese Unexamined Patent Application Publication No. 2002-148973 discloses a configuration in which a transfer material is transported by a transport member that is an endless wire and an unfixed toner image transferred onto the transfer material is thermally molten by radiation heat.

SUMMARY

An image forming apparatus may include an image forming part that forms an image at an image formation position on one surface of a recording medium, a transport part that transports the recording medium while holding a front end side of the recording medium so that the recording medium passes the image formation position, and a transport body that transports the recording medium together with the transport part while supporting the other surface of the recording medium on which an image is to be formed by the image forming part. According to this configuration, the recording medium sometimes flaps if the support of the other surface of the recording medium starts after a rear end of the recording medium is separated from the transport body as a result of transport by the transport part.

Aspects of non-limiting embodiments of the present disclosure relate to a technique of suppressing flapping of a recording medium as compared with a configuration in which support of the other surface of the recording medium starts after a rear end of the recording medium is separated from a transport body as a result of transport by a transport part.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including: an image forming part that forms an image at an image formation position on one surface of a recording medium; a transport part that transports the recording medium while holding a front end side of the recording medium so that the recording medium passes the image formation position; a transport body that transports the recording medium together with the transport part while supporting the other surface of the recording medium on which an image is to be formed by the image forming part; and a support part that supports the other surface of the recording medium, the support part starting the support before the other surface of the recording medium is separated from the transport body as a result of transport by the transport part.

BRIEF DESCRIPTION OF THE DRAWINGS

An exemplary embodiment of the present disclosure will be described in detail based on the following figures, wherein.

DETAILED DESCRIPTION

Figure 1:
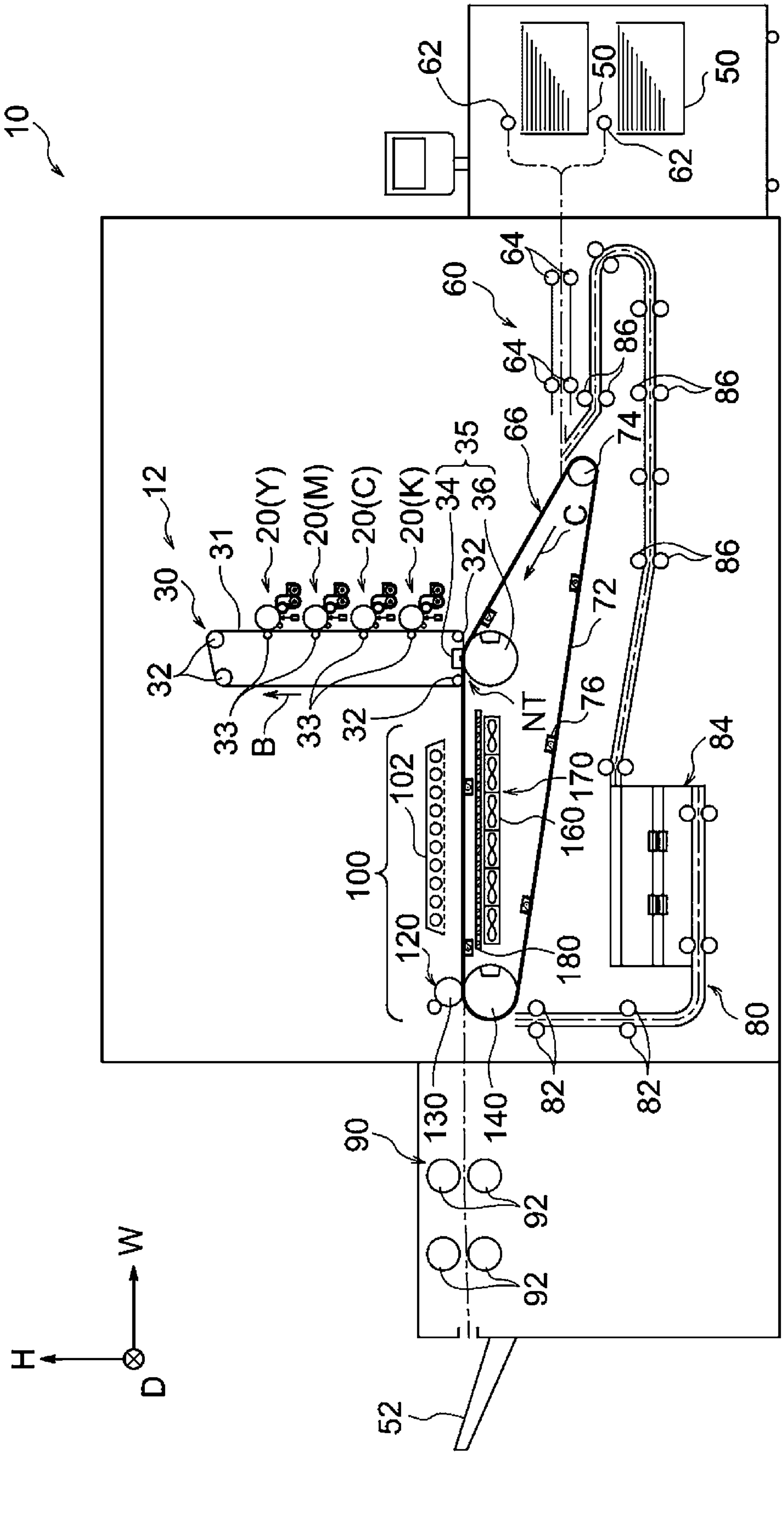
FIG. 1 is a schematic view illustrating a configuration of an image forming apparatus according to the present exemplary embodiment.

An exemplary embodiment of the present disclosure is described below with reference to the drawings. Note that arrow H in the drawings indicates a vertical direction and an apparatus up-down direction, arrow W indicates a horizontal direction and an apparatus width direction, and arrow D indicates an apparatus front-rear direction (apparatus depth direction).

Image Forming Apparatus 10

A configuration of an image forming apparatus 10 according to the present exemplary embodiment is described. FIG. 1 is a schematic view illustrating the configuration of the image forming apparatus 10 according to the present exemplary embodiment.

The image forming apparatus 10 illustrated in FIG. 1 is an example of an image forming apparatus that forms an image on a recording medium. Specifically, the image forming apparatus 10 is an electrophotographic image forming apparatus that forms a toner image on paper P, which is an example of a recording medium. More specifically, as illustrated in FIG. 1, the image forming apparatus 10 includes a storage part 50, a discharge part 52, an image forming part 12, an opposed roll 36, a transport mechanism 60, a reversing mechanism 80, a fixing device 100, an air blowing mechanism 170, and a cooling part 90.

Storage Part 50

The storage part 50 illustrated in FIG. 1 has a function of storing paper P therein. The image forming apparatus 10 includes plural (e.g., two) storage parts 50. Paper P is selectively fed out from the plural storage parts 50. A sheet (cut paper) having a predetermined size is used as the paper P, which is an example of a recording medium. The paper P has a front surface PA (see FIG. 5), which is an example of one surface, and a rear surface PB (see FIG. 5), which is an example of the other surface. The front surface PA of the paper P has an image region GR (see FIG. 4) onto which a toner image is to be transferred, that is, an image region GR on which an unfixed image is to be formed.

Discharge Part 52

The discharge part 52 illustrated in FIG. 1 is a part to which paper P on which an image has been formed is discharged. Specifically, paper P onto which an image has been fixed by the fixing device 100 and that has been cooled by the cooling part 90 is discharged to the discharge part 52.

Image Forming Part 12 and Opposed Roll 36

The image forming part 12 illustrated in FIG. 1 is an example of an image forming part that forms an image on one surface of a recording medium. Specifically, the image forming part 12 has a function of forming a toner image on the front surface PA of the paper P by an electrophotographic system. More specifically, as illustrated in FIG. 1, the image forming part 12 includes a toner image forming part 20 that forms a toner image and a transfer device 30 that transfers the toner image formed by the toner image forming part 20 onto the paper P. The opposed roll 36 (or called a transfer cylinder or a transfer body) is an example of a transport body. Note that a configuration of the opposed roll 36 is described together with a configuration of the transfer device 30.

Toner Image Forming Part 20

The image forming apparatus 10 includes plural toner image forming parts 20 that form toner images of respective colors. The image forming apparatus 10 includes toner image forming parts 20 of four colors, specifically, yellow (Y), magenta (M), cyan (C), and black (K). (Y), (M), (C), and (K) in FIG. 1 indicate constituent parts corresponding to the respective colors.

Figure 2:
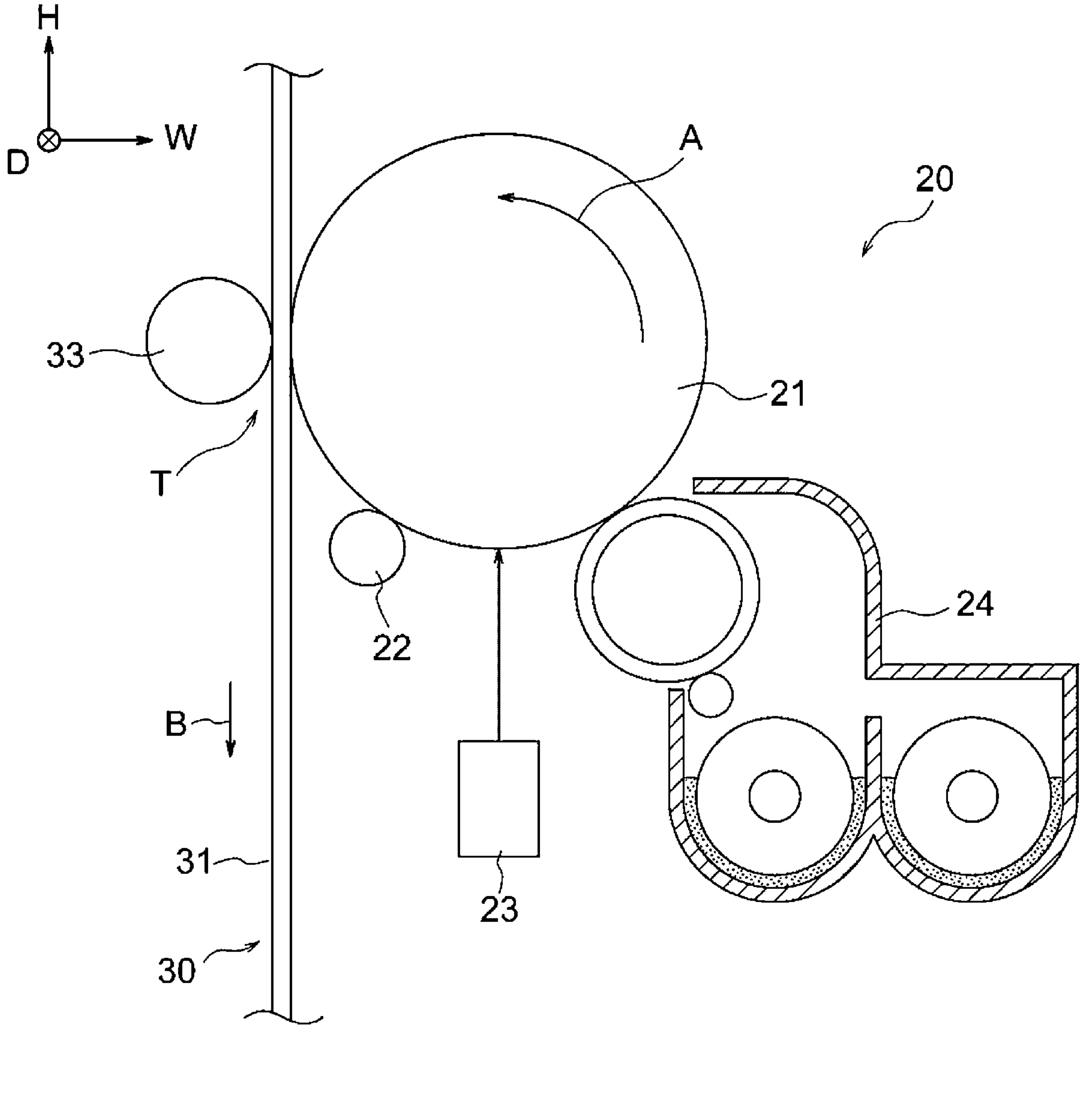
FIG. 2 is a schematic view illustrating a configuration of a toner image forming part according to the present exemplary embodiment.

The toner image forming parts 20 of the respective colors basically have a similar configuration except for used toner. Specifically, as illustrated in FIG. 2, each of the toner image forming parts 20 of the respective colors includes a photoconductor drum 21 (photoconductor) that rotates in a direction indicated by arrow A in FIG. 2 and a charger 22 that charges the photoconductor drum 21. Furthermore, each of the toner image forming parts 20 of the respective colors includes an exposure device 23 that forms an electrostatic latent image on the photoconductor drum 21 by exposing the photoconductor drum 21 charged by the charger 22 to light and a developing device 24 that forms a toner image by developing the electrostatic latent image formed on the photoconductor drum 21 by the exposure device 23.

Transfer Device 30

The transfer device 30 illustrated in FIG. 1 has a function of performing first transfer by superimposing toner images on the photoconductor drums 21 of the respective colors on an intermediate transfer body and second-transferring the superimposed toner images onto the paper P. Specifically, as illustrated in FIG. 1, the transfer device 30 includes a transfer belt 31 serving as an intermediate transfer body, a first transfer roll 33, and a second transfer part 34.

The first transfer roll 33 has a function of transferring a toner image formed on the photoconductor drum 21 onto the transfer belt 31 at a first transfer position T (see FIG. 2) between the photoconductor drum 21 and the first transfer roll 33.

As illustrated in FIG. 1, the transfer belt 31 is an endless belt, and the transfer belt 31 is wound around a plurality of rolls 32, and thereby a posture thereof is determined. At least one of the plural rolls 32 is driven to rotate, and thereby the transfer belt 31 rotates in a direction indicated by arrow B and transports a first-transferred image to a second transfer position NT.

The opposed roll 36 is disposed on a lower side of the transfer belt 31 so as to face the transfer belt 31. As illustrated in FIG. 1, the second transfer part 34 is disposed on an inner side of the transfer belt 31 so that the transfer belt 31 is disposed between the second transfer part 34 and the opposed roll 36. Specifically, the second transfer part 34 is a corotron. The second transfer position NT is located between the second transfer part 34 and the opposed roll 36. At the second transfer position NT, the opposed roll 36 and the transfer belt 31 are in contact with each other. In the present exemplary embodiment, the second transfer part 34 and the opposed roll 36 constitute a transfer part 35 that transfers, onto the paper P, a toner image transferred onto the transfer belt 31. Note that the second transfer position NT is an example of an image formation position.

In the present exemplary embodiment, the paper P that is transported while a front end portion thereof is held by a chain gripper 66 (described later) of the transport mechanism 60 is disposed on an outer circumferential surface of the opposed roll 36, and the paper P is transported by the chain gripper 66 and the opposed roll 36 so as to pass the second transfer position NT. That is, the opposed roll 36 transports the paper P while supporting the rear surface PB of the paper P on the outer circumferential surface thereof. The paper P that has passed the second transfer position NT is further transported by the chain gripper 66, and as a result, a rear end thereof is separated from the opposed roll 36. In the transfer part 35, a toner image transferred onto the transfer belt 31 are transferred onto the paper P passing the second transfer position NT by electrostatic force generated by discharge of the second transfer part 34. At the second transfer position NT, the paper P is transported while being sandwiched between the opposed roll 36 and the transfer belt 31. Therefore, the second transfer position NT can be called a sandwiching position where the paper P is sandwiched between the opposed roll 36 and the transfer belt 31.

Transport Mechanism 60

The transport mechanism 60 illustrated in FIG. 1 is a mechanism that transports the paper P. Specifically, the transport mechanism 60 has a function of transporting the paper P stored in the storage part 50 so that the paper P passes the second transfer position NT. Furthermore, the transport mechanism 60 has a function of transporting the paper P from the second transfer position NT to a fixing unit 120, which will be described later (a heating roll 130 and a pressing roll 140, which will be described later). In other words, the transport mechanism 60 has a function of transporting, in the fixing device 100, the paper P onto which a toner image has been transferred.

Specifically, as illustrated in FIG. 1, the transport mechanism 60 includes a feeding roll 62, plural transport rolls 64, and the chain gripper 66. The feeding roll 62 is a roll that feeds out the paper P stored in the storage part 50. The plural transport rolls 64 are rolls that transport the paper P fed out by the feeding roll 62 to the chain gripper 66.

Figure 3:
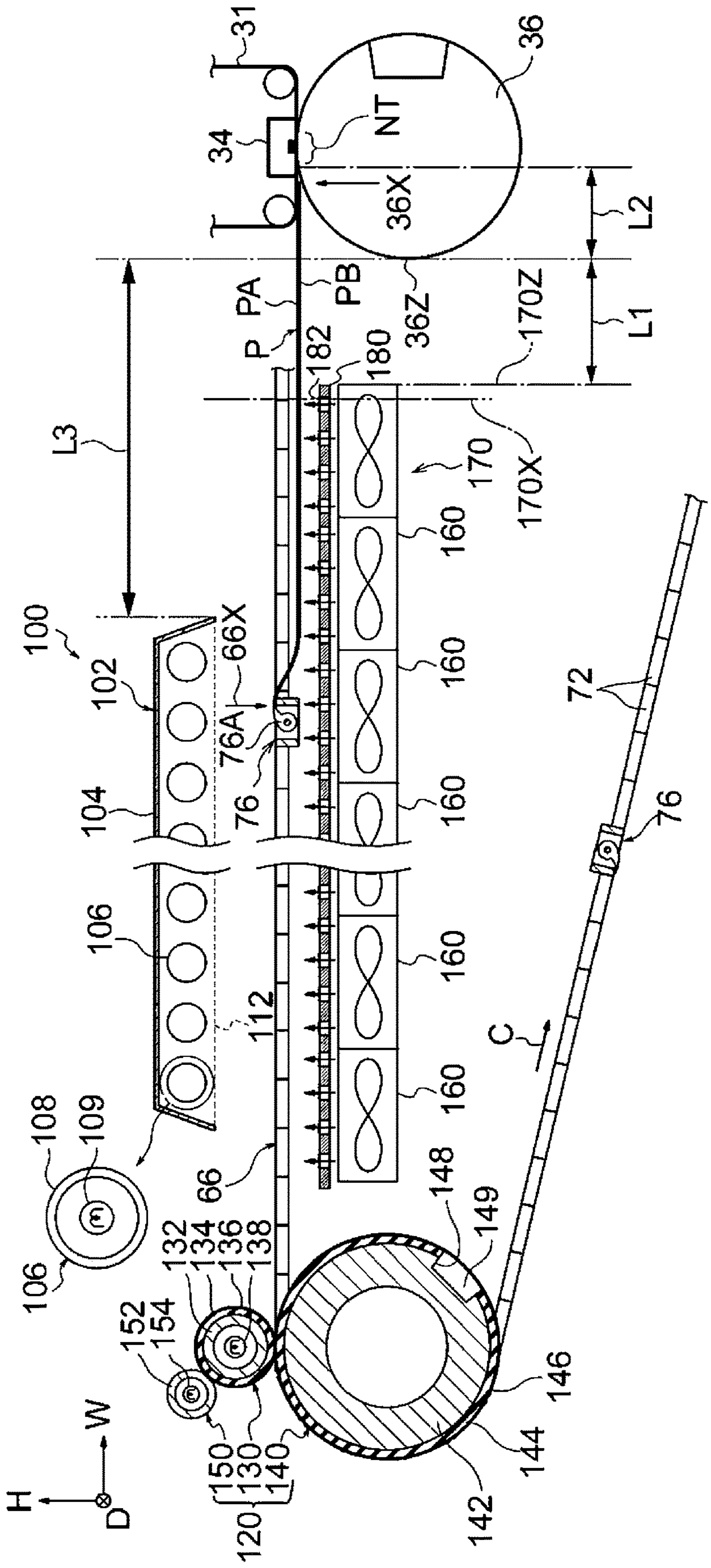
FIG. 3 is a schematic view illustrating a configuration of a fixing device according to the present exemplary embodiment.
Figure 4:
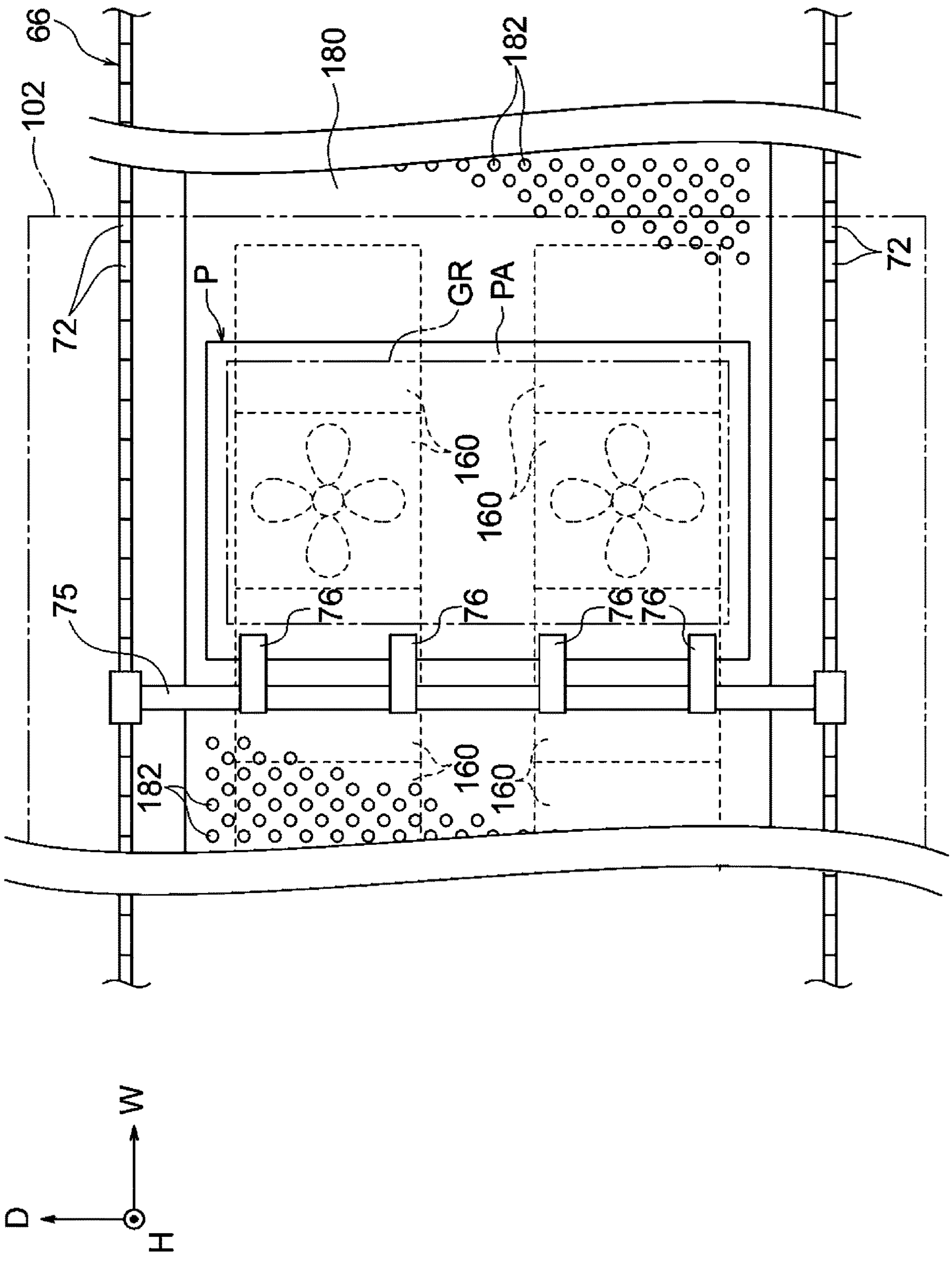
FIG. 4 is a plan view illustrating the configuration of the fixing device according to the present exemplary embodiment.

As illustrated in FIGS. 3 and 4, the chain gripper 66 is a transport part that transports the paper P while holding a front end side (leading end side) of the paper P. Specifically, the chain gripper 66 includes a pair of chains 72 and a gripper 76 serving as a holding member (gripping member).

The pair of chains 72 have an annular shape, as illustrated in FIG. 1. The chains 72 are spaced apart from each other in the apparatus front-rear direction (the direction D in FIG. 1) (see FIG. 4). The pair of chains 72 are wound around a pair of sprockets (not illustrated) disposed on one end side and the other end side, in an axial direction, of each of the opposed roll 36 and the pressing roll 140, which will be described later, and a pair of sprockets 74 that are spaced apart from each other in the apparatus front-rear direction. Any of these pairs of sprockets rotates, and thereby the chains 72 rotates in a direction indicated by arrow C (see FIG. 1).

As illustrated in FIG. 4, an attachment member 75 provided with the gripper 76 extends between the pair of chains 72 along the apparatus front-rear direction. As the attachment member 75, plural attachment members 75 are fixed to the pair of chains 72 at predetermined intervals along a circumferential direction (circling direction) of the chains 72. In the drawings, constituent parts of the chains 72 are illustrated as blocks for simplification of illustration of the chains 72.

Figure 5:
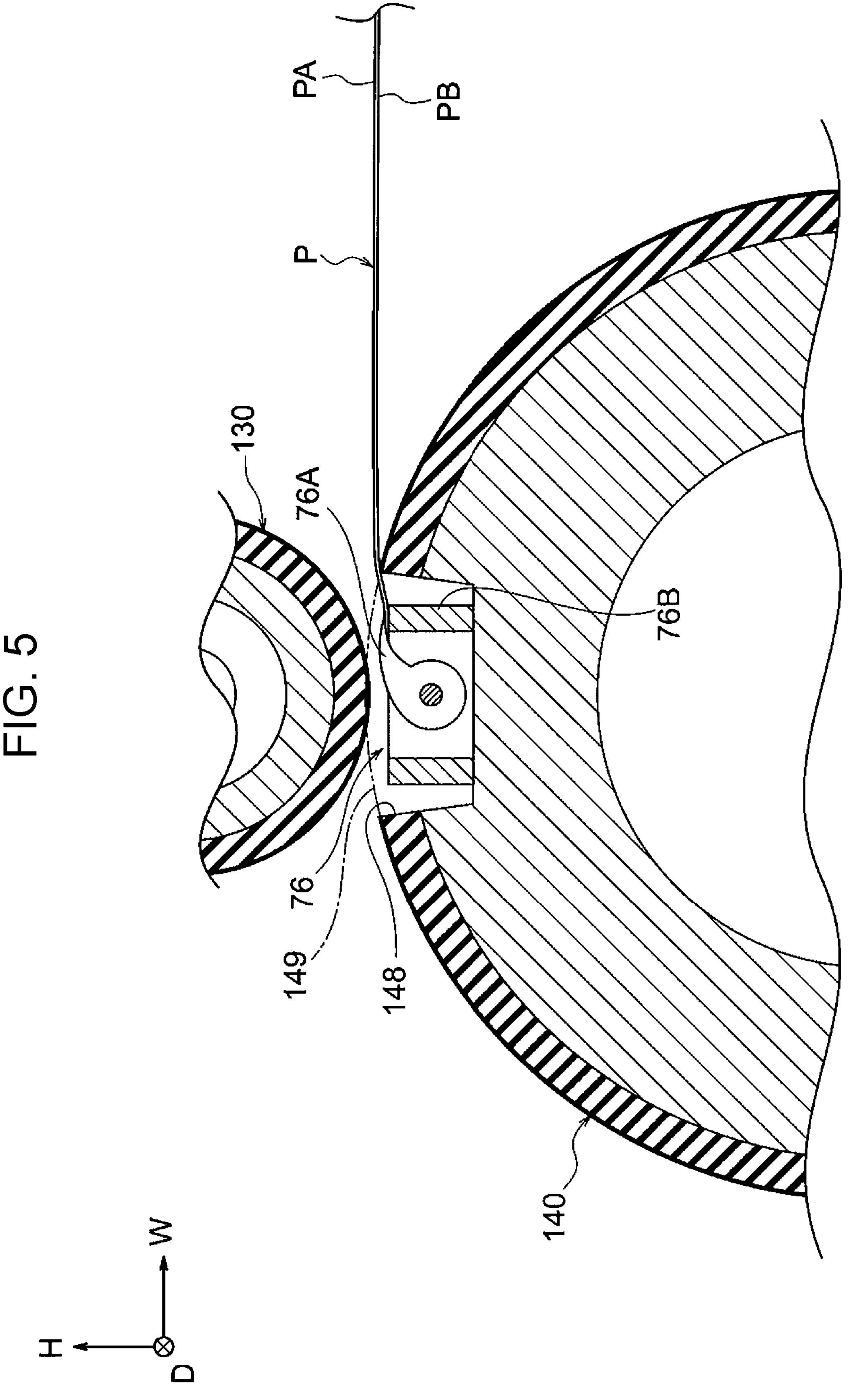
FIG. 5 is an enlarged schematic view of a part of a fixing unit according to the present exemplary embodiment.

As illustrated in FIG. 4, as the gripper 76, plural grippers 76 are attached to each of the attachment members 75 at predetermined intervals along the apparatus front-rear direction. Each of the grippers 76 has a function of holding (gripping) a front end portion of the paper P. Since the front end portion of the paper P is held, a position of the paper P in a paper transport direction is easily determined, and therefore position alignment (registration) between the paper P and an image is easy in the transfer part 35. Specifically, as illustrated in FIGS. 3 and 5, each of the grippers 76 has a claw 76A and a claw rest 76B. Each of the gripper 76 is configured to hold the paper P by pinching a front end portion of the paper P between the claw 76A and the claw rest 76B. Specifically, each of the grippers 76 holds the front end portion of the paper P outside the image region GR (see FIG. 4) where a toner image is to be transferred on the front surface PA. Furthermore, in the present exemplary embodiment, the grippers 76 disposed on a downstream side relative to the paper P in the transport direction hold the front end portion of the paper P from the downstream side in the transport direction. Note that each of the grippers 76 is, for example, configured such that the claw 76A is pressed against the claw rest 76B by a spring or the like and the claw 76A is opened and closed with respect to the claw rest 76B by action of a cum or the like. Note that a mark called a trim mark for a position for cutting the paper P into a finished size by trimming edges when creating a printed material or for registration in multi-color printing is sometimes formed outside the image region GR. Such an image may be formed so as to overlap the grippers 76 in top view illustrated in FIG. 4. Each of the grippers 76 may partially overlap the image region GR but should not overlap an image to be formed.

In the chain gripper 66, the chains 72 circle in a direction indicated by arrow C in a state where the grippers 76 hold the front end portion of the paper P, and thereby the paper P is transported. The chain gripper 66 transports the paper P to the second transfer position NT in a state where the front surface PA faces upward, and thereby causes the paper P to pass the second transfer position NT. Furthermore, the chain gripper 66 transports the paper P to the fixing unit 120, which will be described later, after the paper P passes a heating part 102, which will be described later. Note that the chain gripper 66 holds the front end portion but does not hold the rear end side of the paper P, and therefore the rear end side of the paper P that is being transported only by the chain gripper 66 is free.

As described above, a part of the chain gripper 66 that has a function of causing the paper P to pass the heating part 102 and transporting the paper P from the heating part 102 to the fixing unit 120 also serves as the fixing device 100. Note that a part of a transport path along which the paper P is transported in the transport mechanism 60 is indicated by the line with alternate long and short dashes in FIG. 1. Hereinafter, an upstream in the transport direction in which the paper P is transported by the transport mechanism 60 is sometimes expressed simply as an "upstream", and a downstream in the transport direction is sometimes expressed simply as a "downstream".

Reversing Mechanism 80

The reversing mechanism 80 illustrated in FIG. 1 is an example of a reversing mechanism for reversing a recording medium on which an image has been fixed by the fixing device. Specifically, the reversing mechanism 80 is a mechanism that reverses the paper P on which a toner image has been fixed by the fixing device 100. More specifically, as illustrated in FIG. 1, the reversing mechanism 80 includes plural (e.g., two) transport rolls 82, a reversing device 84, and plural (e.g., seven) transport rolls 86.

The plural transport rolls 82 are rolls that transport the paper P fed from the fixing device 100 to the reversing device 84.

The reversing device 84 is, for example, a device that reverses the paper P by transporting the paper P while twisting the paper P plural times like a Mobius strip so that a transport direction of the paper P changes, for example, by 90 degrees each time.

The plural transport rolls 86 are rolls that transport the paper P that has been reversed by the reversing device 84 to the chain gripper 66. That is, the plural transport rolls 86 have a function of delivering the reversed paper P to the chain gripper 66.

As described above, the reversing mechanism 80 delivers the paper P to the chain gripper 66 after reversing the paper P, and therefore the chain gripper 66 transports the delivered paper P as paper P having a fixed toner image on the rear surface PB.

Note that a part of a transport path along which the paper P is transported in the reversing mechanism 80 is indicated by the line with alternate long and short dashes in FIG. 1. The reversing mechanism 80 may be a mechanism that reverses the paper P by switchback.

Fixing Device 100

The fixing device 100 illustrated in FIG. 3 is an example of a fixing device that fixes an image formed by the image forming part on a recording medium. Specifically, the fixing device 100 is a device that fixes a toner image transferred by the transfer device 30 onto the paper P.

As illustrated in FIG. 1, the fixing device 100 is disposed on a downstream side relative to the second transfer position NT in the transport direction of the paper P. As illustrated in FIG. 3, the fixing device 100 includes the heating part 102, the chain gripper 66, and the fixing unit 120 (fixing part).

Heating Part 102

The heating part 102 illustrated in FIG. 3 is an example of a heating part that heats a front surface of a recording medium in a non-contact manner. Specifically, the heating part 102 has a function of heating the front surface PA of the paper P transported by the chain gripper 66 in a non-contact manner.

This heating part 102 is disposed on a downstream side relative to the second transfer position NT (see FIG. 1) in the transport direction of the paper P so as to face the front surface PA of the paper P transported by the chain gripper 66. Specifically, the heating part 102 includes a reflection plate 104, plural heaters 106 (heating source), and a metal mesh 112.

Reflection Plate 104

The reflection plate 104 has a function of reflecting infrared rays from the heaters 106 toward an apparatus lower side (toward the paper P transported by the chain gripper 66). The reflection plate 104 is, for example, a metal plate such as an aluminum plate. The reflection plate 104 has a box shape that is opened on the apparatus lower side.

Heaters 106

The heaters 106 are cylindrical infrared heaters that are long in the apparatus front-rear direction. The plural (e.g., 40) heaters 106 are arranged along the apparatus width direction in the reflection plate 104. Specifically, each of the heaters 106 includes a carbon filament 109 and a cylindrical quartz tube 108 in which the carbon filament 109 is stored. A black infrared radiation film is provided on a front surface of the quartz tube 108. Since the black infrared radiation film is provided on the front surface of the quartz tube 108, the heaters 106 efficiently radiate infrared rays, for example, as compared with a case where a white film is provided. In the present exemplary embodiment, black is a color whose chromaticity deviation from an achromatic point (x=0.333, y=0.333, Y=0) is within 100 in terms of a color difference ΔE. Note that in FIG. 3, an enlarged view of the heater 106 is illustrated on an upper left side of the heating part 102 in order to illustrate a specific configuration of the heaters 106. A wavelength peak of a radiation wavelength of an infrared ray of the infrared heaters 106 according to the present exemplary embodiment is within a range from 2 μm to 5 μm inclusive and is within a far-infrared range. A surface temperature of the heaters 106 of the heating part 102 is a predetermined temperature within a range from 300° C. to 1175° C. inclusive. In the present exemplary embodiment, 20 to 100 heaters 106 that efficiently radiate a far-infrared ray are arranged in the apparatus width direction per meter of the length of the reflection plate 104 in the apparatus width direction, and thereby a good heating distribution is obtained.

In a case where toner on a wide recording medium that has an A2 size or larger is transported while a long side thereof is disposed along a transport direction of the recording medium and is heated by less than 20 far-infrared heaters 106 per meter, a voltage applied to a carbon filament needs to be increased to increase an output amount of each heater 106. In this case, a temperature of the black infrared radiation film rises, and melting of toner caused by heat conduction from surrounding air heated by a near-infrared light component become more dominant than a far-infrared ray. As a result, melting unevenness occurs close to the heaters 106 and between the heaters 106. On the other hand, in a case where 20 or more heaters 106 are provided per meter, radiation of a far-infrared ray can be made dominant in the carbon filament, and therefore a far-infrared ray, which is less dependent on a distance from a radiation source concerning toner melting, can be effectively used as compared with a case where less than 20 heaters 106 are provided. This reduces melting unevenness between the heaters 106. In a case where more than 100 heaters 106 are provided, excessive far-infrared rays are radiated, and therefore it becomes difficult to control a temperature of an object to be irradiated to such a degree that toner melts, and it becomes difficult to control a temperature of the fixing device in a later stage since the fixing device is heated by heat of toner. Therefore, it is desirable that 100 or less heaters 106 be provided. In particular, in a case where a recording medium having a B2 size or larger is transported while a long side thereof is disposed along a transport direction of the recording medium, it is desirable that 30 or more and 50 or less heaters 106 be provided.

Metal Mesh 112

The metal mesh 112 is fixed to an edge portion of an opening on a lower side of the reflection plate 104. Accordingly, the metal mesh 112 serves as a partition between an inside of the reflection plate 104 and an outside of the reflection plate 104. The metal mesh 112 prevents contact between the paper P transported by the chain gripper 66 and the heaters 106.

Chain Gripper 66

The chain gripper 66 illustrated in FIG. 3 is an example of a transport part that transports a recording medium so that a front surface of the recording medium faces a heating part. The grippers 76 of the chain gripper 66 are an example of a holding part that holds at least a front end side of a recording medium. Note that the front end side of the recording medium is a portion of the recording medium on a downstream side (front side) relative to a center thereof in the transport direction.

Specifically, as described above, the chains 72 circle in the direction indicated by arrow C while the grippers 76 are holding the front end portion of the paper P, and thereby the chain gripper 66 transports the paper P so that the front surface PA of the paper P faces the heaters 106 of the heating part 102. That is, the chain gripper 66 has a function of causing the paper P to pass a heating region of the heating part 102. Note that a rear end side of the paper P is not held and is free while the paper P is being transported by the chain gripper 66.

Furthermore, the chain gripper 66 has a function of transporting the paper P from the heating part 102 and the fixing unit 120. As described above, a part of the chain gripper 66 that has the function of causing the paper P to pass the heating region of the heating part 102 and transporting the paper P from the heating part 102 and the fixing unit 120 functions as an example of a transport part of the fixing device 100.

Fixing Unit 120

The fixing unit 120 illustrated in FIG. 3 is a fixing part that fixes an image on the paper P onto the paper P. Specifically, the fixing unit 120 has a function of fixing a toner image onto the paper P by heating and pressing the paper P while making contact with the paper P. Although a case where the fixing unit 120 that heats and presses the paper P is used is described in the present exemplary embodiment, heating is not necessarily needed, and an aspect in which only pressing by a pressing part is performed for the purpose of improving a surface property of toner molten by the heating part 102 in a previous step, for example, for the purpose of adjusting gloss is also applicable.

As illustrated in FIG. 3, the fixing unit 120 is disposed on a downstream side relative to the heating part 102 in the transport direction of the paper P. Specifically, the fixing unit 120 includes the heating roll 130, the pressing roll 140, and a driven roll 150.

Heating Roll 130

The heating roll 130 illustrated in FIG. 3 is an example of a heating member that is disposed on a downstream side relative to the heating part in the transport direction and heats a recording medium. Specifically, the heating roll 130 is disposed on a downstream side relative to the heating part 102 in the transport direction and has a function of heating the paper P by making contact with the paper P. The heating roll 130 is disposed so as to make contact with the front surface PA of the paper P and have an axial direction in the apparatus front-rear direction.

The heating roll 130 includes a cylindrical base member 132, a rubber layer 134 provided on an outer circumference of the base member 132, a release layer 136 provided on an outer circumference of the rubber layer 134, and a heater 138 (heating source) that is stored in the base member 132. The heater 138 is, for example, one or more halogen lamps.

Figure 6:
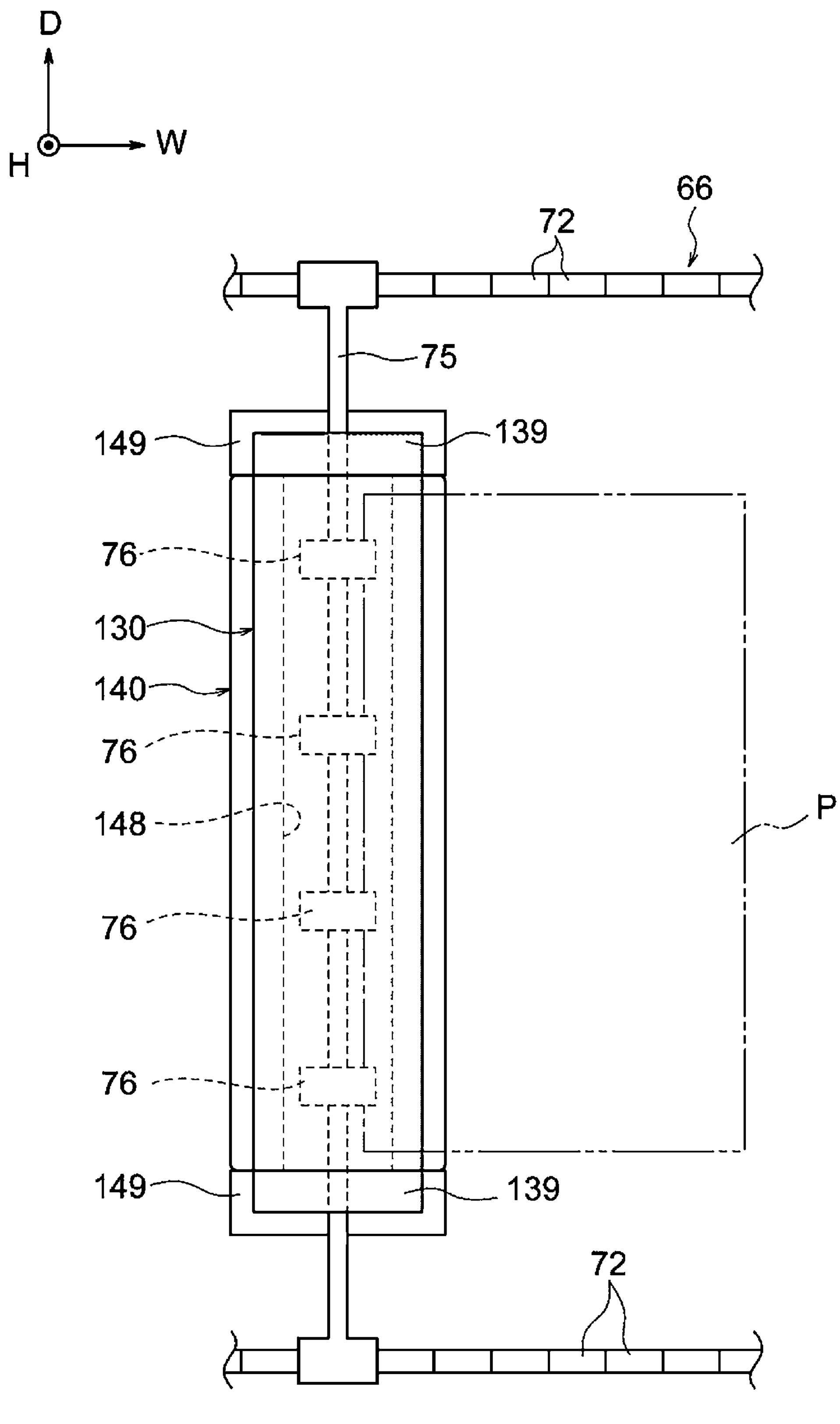
FIG. 6 is a plan view illustrating the fixing unit according to the present exemplary embodiment.

As illustrated in FIG. 6, the heating roll 130 is provided with an abutted part 139 that abuts on an abutting part 149 (described later) of the pressing roll 140. The abutted part 139 is an example of an abutted part of a heating roll. Specifically, the abutted part 139 has a cylindrical shape having an external diameter equivalent to the heating roll 130. Furthermore, the abutted part 139 is provided at one end portion and the other end portion of the heating roll 130 in an axial direction so as to be coaxial with the heating roll 130 and rotate integrally with the heating roll 130.

Driven Roll 150

The driven roll 150 illustrated in FIG. 3 is disposed so as to make contact with a region on the outer circumferential surface of the heating roll 130 other than a region that makes contact with the paper P and have an axial direction in the apparatus front-rear direction. The driven roll 150 includes a cylindrical base member 152 and a heater 154 (heating source) stored in the base member 152. The driven roll 150 is driven by the heating roll 130 to rotate and heats the heating roll 130. Since the heating roll 130 is heated by the driven roll 150 and the heating roll 130 itself includes the heater 138, a front surface temperature of the heating roll 130 becomes a predetermined temperature.

Pressing Roll 140

The pressing roll 140 illustrated in FIG. 3 is an example of a pressing member that presses a recording medium together with the heating roll and has, on an outer circumferential surface thereof, a recessed part into which the holding part enters. Specifically, the pressing roll 140 has a function of pressing the paper P against the heating roll 130. The pressing roll 140 is disposed on a lower side of the heating roll 130 so as to have an axial direction in the apparatus front-rear direction.

The pressing roll 140 includes a cylindrical base member 142, a rubber layer 144 provided on an outer circumference of the base member 142, and a release layer 146 provided on an outer circumference of the rubber layer 144.

A perimeter of the pressing roll 140 is set identical to an interval at which the grippers 76 are provided on the chains 72. As illustrated in FIGS. 5 and 6, the pressing roll 140 has, on an outer circumferential surface thereof, a recessed part 148 extending in the apparatus front-rear direction.

When the grippers 76 that hold the front end side of the paper P passes between the pressing roll 140 and the heating roll 130, the grippers 76 enter into the recessed part 148.

As illustrated in FIG. 6, the pressing roll 140 has the abutting part 149 that abuts on the abutted part 139 of the heating roll 130. The abutting part 149 is an example of an abutting part that is provided outside the recessed part of the pressing roll in an axial direction and keeps a center distance between the heating roll 130 and the pressing roll 140 by abutting on the abutted part 139.

The abutting part 149 has a cylindrical shape having an external diameter equivalent to the pressing roll 140. The abutting part 149 is provided outside the recessed part 148 of the pressing roll 140 in the axial direction. Specifically, the abutting part 149 is provided at one end portion and the other end portion of the pressing roll 140 in the axial direction so as to be coaxial with the pressing roll 140 and rotate integrally with the pressing roll 140.

The heating roll 130 and the pressing roll 140 rotate in a state where the abutting part 149 is abutting on the abutted part 139, and thereby the center distance between the heating roll 130 and the pressing roll 140 is kept even when the recessed part 148 faces the heating roll 130. As a result, a surface pressure of a load by which the pressing roll 140 is biased toward the heating roll 130 by a biasing member (not illustrated) falls within a certain range. A surface pressure in a conventional typical fixing device is approximately 400 kPa.

In the fixing unit 120, the pressing roll 140 is driven by a driving part (not illustrated) to rotate, the heating roll 130 is driven by the pressing roll 140 to rotate, and the driven roll 150 is driven by the heating roll 130 to rotate.

Air Blowing Mechanism 170

The air blowing mechanism 170 illustrated in FIG. 3 is an example of a support part and is an example of an air blowing part. The air blowing mechanism 170 is a mechanism that blows air toward the rear surface PB of the paper P. Specifically, the air blowing mechanism 170 includes an air blower 160 and a ventilation plate 180.

Air Blower 160

The air blower 160 illustrated in FIG. 3 is a device that blows air toward the rear surface PB of the paper P. As the air blower 160, plural air blowers 160 are disposed on an inner side (inner circumferential side) of the chains 72 when viewed in the apparatus front-rear direction so as to be located below the heating part 102. As illustrated in FIGS. 3 and 4, the plural air blowers 160 are disposed two-dimensionally (in a matrix) along the transport direction of the paper P and the apparatus front-rear direction. Note that in FIG. 4, blades of some of the air blowers 160 are omitted for simplification of illustration of the air blowers 160.

As illustrated in FIG. 3, each of the air blowers 160 faces upward and blows air upward. That is, each of the air blowers 160 is configured to blow air only toward the rear surface PB of the paper P facing the heating part 102 in a thickness direction of the paper P. In other words, each of the air blowers 160 is disposed so as to face the rear surface PB of the paper P transported by the chain gripper 66. In still other words, the chain gripper 66 transports the paper P so that the rear surface PB of the paper P faces the air blowers 160.

Each of the air blowers 160 is, for example, an axial flow blower that blows air in an axial direction. Note that each of the air blowers 160 may be a centrifugal blower that blows air in a centrifugal direction, such as a multi-blade blower (e.g., a sirocco fan).

The air blowers 160 blow air toward the rear surface PB of the paper P transported by the chain gripper 66, and thus the paper P floats up. This brings the rear surface PB of the paper P into a non-contact state. Specifically, at least the rear surface PB within the image region GR of the paper P is brought into a non-contact state. More specifically, at least the rear surface PB within the image region GR of the paper P is brought into a state of not being in contact with the ventilation plate 180. Therefore, the air blowers 160 have a function of keeping a non-contact state of the rear surface PB within the image region GR of the paper P while the paper P is being transported by the chain gripper 66. Note that the rear surface PB outside the image region GR of the paper P is permitted to make contact with the ventilation plate 180. Note that it is necessary to prevent air blown from an air outlet of each of the air blowers 160 from being directly supplied to the front surface PA of the paper P. This is because the image forming apparatus 10 according to the present exemplary embodiment is an image forming apparatus that forms an image by using dry toner and if air is directly supplied to the front surface of the paper P from the air outlet, an unfixed toner image may be disturbed. Furthermore, by supplying air only to the rear surface PB, toner transferred onto the front surface PA is less cooled.

Ventilation Plate 180

The ventilation plate 180 illustrated in FIG. 3 is an example of a ventilation part having plural ventilation holes through which air blown from the air blowing part toward the rear surface of the recording medium passes. Specifically, the ventilation plate 180 is a plate having plural ventilation holes 182 through which air blown from the air blowers 160 toward the rear surface PB of the paper P passes.

The ventilation plate 180 is disposed on an inner side (inner circumferential side) of the chains 72 so as to be located below the heating part 102 and above the air blowers 160 when viewed from the apparatus front-rear direction and have a thickness direction in the apparatus up-down direction. That is, the ventilation plate 180 is disposed on an air blowing direction side of the air blowers 160 so as to cover the air blowers 160. In other words, the ventilation plate 180 can be regarded as an example of a disposed member that is disposed so as to face the rear surface PB of the paper P transported by the chain gripper 66.

Each of the ventilation holes 182 passes through the ventilation plate 180 in the thickness direction. As illustrated in FIG. 4, the plural ventilation holes 182 are disposed two-dimensionally (in a matrix) along the transport direction of the paper P and the apparatus front-rear direction. In FIG. 4, some of the ventilation holes 182 are omitted for simplification of illustration of the ventilation plate 180.

The ventilation plate 180 allows air blown from the air blowers 160 to pass through the plural ventilation holes 182 and hit the rear surface PB of the paper P transported by the chain gripper 66. In other words, the air blowers 160 blow air toward the rear surface PB of the paper P transported by the chain gripper 66 through the ventilation plate 180 having the plural ventilation holes 182.

The ventilation plate 180 is a metal plate. The ventilation plate 180 also functions as a reflection plate that reflects an infrared ray from the heaters 106 toward an apparatus upper side (side where the paper P is transported by the chain gripper 66).

As described above, in the air blowing mechanism 170, the air blowers 160 blow air toward the rear surface PB of the paper P transported by the chain gripper 66 through the ventilation plate 180 having the plural ventilation holes 182. In this way, the air blowing mechanism 170 supports the paper P from the rear surface PB.

Position of Air Blowing Region in Air Blowing Mechanism 170

In the air blowing mechanism 170, as illustrated in FIG. 3, an upstream end 170X of an air blowing region set by the air blowers 160 and the ventilation plate 180 is disposed between the second transfer position NT and a holding position 66X illustrated in FIG. 3. Specifically, the upstream end 170X is disposed on a downstream side relative to the second transfer position NT and an upstream side relative to the holding position 66X.

Specifically, the upstream end 170X of the air blowing region of the air blowing mechanism 170 is disposed between a separation position 36X illustrated in FIG. 3 and the holding position 66X. Specifically, the upstream end 170X is disposed on a downstream side relative to the separation position 36X and an upstream side relative to the holding position 66X.

The separation position 36X is a position at which the rear end of the paper P transported by the chain gripper 66 is separated from the opposed roll 36. The separation position 36X can be regarded as a downstream end of a region where the paper P makes contact with the outer circumferential surface of the opposed roll 36. In the present exemplary embodiment, the separation position 36X is located on a downstream side relative to the second transfer position NT. In some cases, the rear end of the paper P is separated at a downstream end 36Z (a position rotated from an upper end of the opposed roll 36 by 270 degrees in a clockwise direction) of the opposed roll 36. That is, in some cases, the separation position 36X is located at the downstream end 36Z of the opposed roll 36.

The holding position 66X is a position at which the chain gripper 66 holds the paper P in a case where the rear end of the paper P transported by the chain gripper 66 is located at the separation position 36X. The paper Pin this case is paper P of a minimum size used in the image forming apparatus 10. Note that it is at least necessary that the holding position 66X is a holding position defined by paper P of a maximum size used in the image forming apparatus 10.

The air blowing mechanism 170 starts support of the rear surface PB by blown air before the rear end of the paper P passes the separation position 36X. That is, the air blowing mechanism 170 starts support of the rear surface PB by blown air before the rear end of the paper P is separated from the opposed roll 36. Specifically, the air blowing mechanism 170 starts support of the rear surface PB by blown air before the rear end of the paper P finishes passing the second transfer position NT. That is, the air blowing mechanism 170 starts support of the rear surface PB by blown air while the paper P is passing the second transfer position NT.

Furthermore, the air blowing mechanism 170 supports the rear surface PB of the paper P by blowing air toward the rear surface PB of the paper P that has passed the second transfer position NT until the rear end of the paper P reaches the downstream side of the air blowing region. As described above, the air blowing mechanism 170 starts support of the rear surface PB of the paper P before the rear end of the paper P is separated from the opposed roll 36 as a result of transport by the chain gripper 66. At the start of air blowing, an airflow tends to become unstable. Also from this point of view, it is desirable that air blowing is started while the opposed roll 36 and the rear surface PB of the paper P are in contact (before separation).

Since the upstream end 170X of the air blowing region of the air blowing mechanism 170 is disposed between the separation position 36X and the holding position 66X illustrated in FIG. 3 as described above, the rear end of the paper P is separated from the opposed roll 36 while air is being blown toward a rear end side of the rear surface PB of the paper P relative to the holding position 66X. That is, the rear end of the paper P is separated from the opposed roll 36 while the air blowing mechanism 170 is supporting the rear surface PB on the rear end side relative to the holding position 66X.

In the air blowing mechanism 170, the air blowing region set by the air blowers 160 and the ventilation plate 180 is set longer toward an upstream in the transport direction of the paper P than a heating region set by the heating part 102. That is, air is blown toward the rear surface PB of the paper P that has passed the transfer part 35 by the air blowers 160 before the paper P enters the heating part 102. Accordingly, the paper P is carried to the heating part 102 while keeping a stable posture. More desirably, the air blowing region is set from a point that immediately follows the transfer part 35 and does not overlap the transfer belt 31 in a gravitational direction toward a downstream in the transport direction of the paper P.

In the air blowing mechanism 170, the air blowing region set by the air blowers 160 and the ventilation plate 180 is set longer toward a downstream in the transport direction of the paper P than the heating region set by the heating part 102. That is, the air blowing mechanism 170 blows air toward the rear surface PB of the paper P even after the paper P passes the heating region of the heating part 102. Accordingly, the paper P is carried to the fixing unit 120 while keeping a stable posture.

Cooling Part 90

As illustrated in FIG. 1, the cooling part 90 is disposed on a downstream side relative to the fixing unit 120 in the transport direction of the paper P. The cooling part 90 includes plural (e.g., two) cooling rolls 92 arranged in the apparatus width direction.

The cooling rolls 92 are cylindrical rolls made of a metal or the like. Air passes inside the cooling rolls 92, and thereby the cooling rolls 92 air-cool the paper P (cool the paper P through heat exchange with air).

Supplements Concerning Image Forming Apparatus 10

A length of the paper P used in the image forming apparatus 10 in the transport direction is, for example, within a range from 570 mm to 680 mm inclusive. A distance along a circumferential direction of the chains 72 (transport direction) between the plural grippers 76 arranged along the circumferential direction is, for example, 840 mm. A distance along the circumferential direction (transport direction) between sheets of paper P held by the plural grippers 76 is, for example, within a range from 160 mm to 270 mm inclusive.

A distance L1 from an upstream end 170Z of the air blowing mechanism 170 to the downstream end 36Z of the opposed roll 36 is, for example, within a range from 230 mm to 260 mm inclusive. A diameter of the opposed roll 36 is, for example, 285 mm. A distance L2 from the second transfer position NT to the downstream end 36Z of the opposed roll 36 is, for example, 140 mm.

A distance L3 from an upstream end of the heating part 102 (an upstream end of the heating region) to the downstream end 36Z of the opposed roll 36 may be longer than the maximum paper length 680 mm. When the paper P burns because of the heating part 102, the opposed roll 36 may burn if the paper P is in contact with the opposed roll 36. However, according to this configuration, the burning can be avoided.

An upper surface of the air blowing mechanism 170 (an upper surface of the ventilation plate 180 in the present exemplary embodiment) or at least an upstream end of the upper surface of the air blowing mechanism 170 (the upper surface of the ventilation plate 180 in the present exemplary embodiment) and at least an upstream end of the air blowing region are located below an upper end of the opposed roll 36 in the gravitational direction.

In the present exemplary embodiment, it is also possible to employ a configuration in which the upstream end 170Z of the air blowing mechanism 170 and the upstream end 170X of the air blowing region are disposed between the separation position 36X and the holding position 66X illustrated in FIG. 3 and air blowing is started after the rear end of the paper P is separated from the opposed roll 36 and before the rear end of the paper P makes contact with the air blowing mechanism 170 (the air blowers 160 or the ventilation plate 180). Note that the paper P makes contact with the air blowing mechanism 170 because the paper P droops down. The configuration may be, for example, realized by starting air blowing at a timing at which the rear end of the paper P is detected by a sensor disposed on a downstream side relative to the separation position 36X or may be, for example, realized by starting air blowing after elapse of a predetermined period from a timing of detection of the rear end of the paper P by a sensor disposed at a predetermined position. The predetermined period is, for example, measured by a timer.

Alternatively, it is also possible to employ a configuration in which air blowing is started after the paper P is separated from the opposed roll 36 and before the rear end of the paper P falls below the upper surface of the air blowing mechanism 170 in the gravitational direction between the upstream end 170Z of the air blowing mechanism 170 and the opposed roll 36. This configuration may be, for example, realized by starting air blowing at a timing at which the rear end of the paper P is detected by a sensor disposed on a downstream side relative to the separation position 36X or may be, for example, realized by starting air blowing after elapse of a predetermined period from a timing of detection of the rear end of the paper P by a sensor disposed at a predetermined position. The predetermined period is, for example, measured by a timer.

In the present exemplary embodiment, the reflection plate 104 and a heat-insulating cover are integral with each other. The upstream end 170Z of the air blowing mechanism 170 and the upstream end 170X of the air blowing region are located on an upstream side relative to the heating part 102, and the air blowing mechanism 170 and the air blowing region are present on an upstream side relative to the reflection plate 104 and the heat-insulating cover.

If the paper P makes contact with a member that tends to receive heat such as the reflection plate 104 or the heat-insulating cover, the paper P may burn. Furthermore, when the paper P makes contact with such a member, disturbance of a toner image can occur. In the present exemplary embodiment, the air blowing mechanism 170 and the air blowing region are present on an upstream side relative to the reflection plate 104 and the heat-insulating cover, and therefore the paper P is supported stably in a non-contact manner before the paper P passes the reflection plate 104 and the heat-insulating cover.

The air blowing mechanism 170 and the air blowing region are also present on a downstream side relative to the reflection plate 104 and the heat-insulating cover. Accordingly, the paper P is stably supported until the paper P is transported to the fixing unit 120 after passing the reflection plate 104 and the heat-insulating cover. Note that the reflection plate 104 and the heat-insulating cover may be separate members.

Operation According to Present Exemplary Embodiment

The paper P fed out from the storage part 50 illustrated in FIG. 1 is transported by the plural transport rolls 64 and is delivered to the chain gripper 66. The paper P delivered to the chain gripper 66 is transported to the second transfer position NT by the chain gripper 66 while a front end portion of the paper P is being held by the grippers 76, and a toner image is transferred from the transfer belt 31 onto the front surface PA. As illustrated in FIG. 3, the paper P onto which the toner image has been transported is transported by the chain gripper 66 in a state where the front surface PA faces the heaters 106 of the heating part 102, and thus the toner image is heated.

The paper P whose toner image has been heated by the heating part 102 is further transported to the fixing unit 120 by the chain gripper 66 and is pressed and heated by being held between the heating roll 130 and the pressing roll 140. In this way, the toner image is fixed onto the paper P. In a case where an image is formed only on the front surface PA of the paper P, the paper P onto which the toner image has been fixed is discharged to the discharge part 52 after being cooled by the cooling rolls 92 of the cooling part 90 illustrated in FIG. 1.

In the present exemplary embodiment, as described above, the air blowing mechanism 170 starts support of the rear surface PB of the paper P by blown air after the rear end of the paper P is separated from the opposed roll 36 as a result of transport by the chain gripper 66. That is, the air blowing mechanism 170 starts support of the rear surface PB of the paper P by blown air before the rear end of the paper P is separated from the opposed roll 36.

In a configuration (hereinafter referred to as a configuration A) in which the air blowing mechanism 170 starts support of the rear surface PB of the paper P by blown air after the rear end of the paper P is separated from the opposed roll 36 as a result of transport by the chain gripper 66, only the front end portion of the paper P is held by the chain gripper 66 until the rear end of the paper P is supported by the air blowing mechanism 170 after being separated from the opposed roll 36. Accordingly, the paper P sometimes flaps. In particular, in a case where the paper P is thin paper, the paper P is easier to droop down and flap than thick paper. Once the paper P flaps, the flapping of the paper P is unlikely to cease even in a case where the paper P is supported thereafter. In particular, in a case where an unfixed image of toner, which is an example of powder, is on the paper P from the second transfer position NT to the fixing unit 120, if the paper P flaps, the unfixed image is more likely to make contact with another member in the image forming apparatus 10 or vibration is more likely to occur due to the flapping. This may, for example, undesirably disturb the unfixed toner image or damage or fold the paper P. Furthermore, if the paper P flaps, the paper P is more likely to make contact with the heating part 102, and therefore not only the toner image on the front surface of the paper P is disturbed, but also the paper P burns.

On the other hand, in the present exemplary embodiment, since support of the rear surface PB of the paper P is started before the rear end of the paper P is separated from the opposed roll 36, flapping of the paper P is suppressed as compared with the configuration A. Since the flapping of the paper P is suppressed, disturbance of the toner image and contact of the paper P with the heating part 102 are less likely to occur.

In the present exemplary embodiment, the air blowing mechanism 170 starts support of the rear surface PB by blown air before the rear end of the paper P finishes passing the second transfer position NT. That is, in the present exemplary embodiment, support of the rear surface PB starts from a state where the paper P is held between the opposed roll 36 and the transfer belt 31. Accordingly, flapping of the paper P is suppressed as compared with a configuration in which the air blowing mechanism 170 starts support of the rear surface PB by blown air after the rear end of the paper P finishes passing the second transfer position NT.

In the present exemplary embodiment, the air blowing mechanism 170 supports the rear surface PB on a rear end side relative to the holding position at which the chain gripper 66 holds the paper P. Accordingly, flapping of the paper P is suppressed as compared with a configuration in which the air blowing mechanism 170 supports the rear surface PB at a same position as the holding position at which the chain gripper 66 holds the paper P.

In the present exemplary embodiment, the air blowing mechanism 170 supports the rear surface PB of the paper P in a non-contact manner, and therefore the air blowing mechanism 170 is less likely to interfere with the chain gripper 66 than in a configuration in which the air blowing mechanism 170 supports the recording medium while making contact with the rear surface PB of the paper P.

In the present exemplary embodiment, the rear surface PB of the paper P is supported by blown air, and therefore a degree of freedom of a material used as the recording medium is higher than a configuration in which the rear surface PB of the paper P is supported in a non-contact manner by magnetic force or electrostatic force.

In the present exemplary embodiment, as illustrated in FIG. 3, the air blowers 160 blow air toward the rear surface PB of the paper P transported by the chain gripper 66 in the heating part 102, and thereby the air blowers 160 keep a non-contact state of the rear surface PB within the image region GR of the paper P while the paper P is being transported.

In a configuration (first configuration) in which the rear surface PB within the image region GR of the paper P makes contact with a constituent part of the apparatus when the paper P is transported so that the front surface PA faces the heating part 102, in a case where the constituent part (e.g., the ventilation plate 180) with which the paper P makes contact is heated by the heating part 102 as a result of continued operation of the fixing device 100, the paper P is heated by the constituent part, and melting of toner proceeds.

Accordingly, a toner melting degree at an initial stage of operation of the fixing device 100 and a toner melting degree after continuation of operation of the fixing device 100 are different. Therefore, heating temperatures of the heating part 102 and the heating roll 130 at the initial stage of operation of the fixing device 100 and heating temperatures of the heating part 102 and the heating roll 130 after continuation of operation of the fixing device 100 need to be made different, and therefore it becomes difficult to control the heating temperatures.

On the other hand, in the present exemplary embodiment, the air blowers 160 maintain a non-contact state of the rear surface PB within the image region GR of the paper P during transport of the paper P, and therefore the rear surface PB of the paper P is not heated and influence of heat (e.g., conductive heat) received from the rear surface PB of the paper P is reduced as compared with the first configuration. In other words, control of the heating temperatures of the heating part 102 and the heating roll 130 is prevented from becoming complicated, and in a case of both-sided printing, toner on the rear surface PB of the paper P is kept from melting due to influence of heat, and a toner image is kept from being disturbed due to contact of the rear surface PB of the paper P with the air blowing mechanism 170.

In particular, even in a case where an image to be formed on both surfaces of the paper P and the paper P having a fixed image on the rear surface PB is transported by the chain gripper 66 in the heating part 102, the rear surface PB of the paper P is not heated, and melting of the fixed toner image is suppressed as compared with the first configuration. In particular, from a purpose of suppressing melting of a fixed toner image in a case where an image is to be formed on both surfaces of the paper P, the transport part and the air blowing part are controlled so that the rear surface PB is in a non-contact state when the paper P having a fixed toner image on the rear surface PB passes the heating part 102. In a case where the paper P does not have a fixed toner image on the rear surface PB and has an unfixed toner image only on the front surface PA, the rear surface PB may be always in contact with a member such as the ventilation plate 180 during transport.

In the present exemplary embodiment, in the heating part 102, the air blowers 160 blow air toward the rear surface PB of the paper P transported by the chain gripper 66 through the ventilation plate 180 having the plural ventilation holes 182. Accordingly, air hits the rear surface PB of the paper P more evenly than in a configuration (second configuration) in which air blown from the air blowers 160 directly hits the rear surface PB of the paper P without passing through the ventilation holes 182. As a result, a posture of the paper P is less likely to change than in the second configuration.

In the present exemplary embodiment, as illustrated in FIG. 5, the grippers 76 holding the front end side of the paper P enter into the recessed part 148 in a case where the grippers 76 pass between the pressing roll 140 and the heating roll 130. Accordingly, the grippers 76 are less likely to hinder pressing of the paper P than in a configuration in which the paper P is pressed between the pressing roll 140 having no recessed part 148 and the heating roll 130.

In the present exemplary embodiment, the heating roll 130 and the pressing roll 140 rotate in a state where the abutting part 149 illustrated in FIG. 6 is abutting on the abutted part 139, and therefore a center distance between the heating roll 130 and the pressing roll 140 is kept even in a state where the recessed part 148 faces the heating roll 130. Accordingly, a fluctuation in pressure pressing the paper P is suppressed as compared with a configuration in which the paper P is pressed between the pressing roll 140 and the heating roll 130 without keeping the center distance.

Modification of Chain Gripper 66

Figure 7:
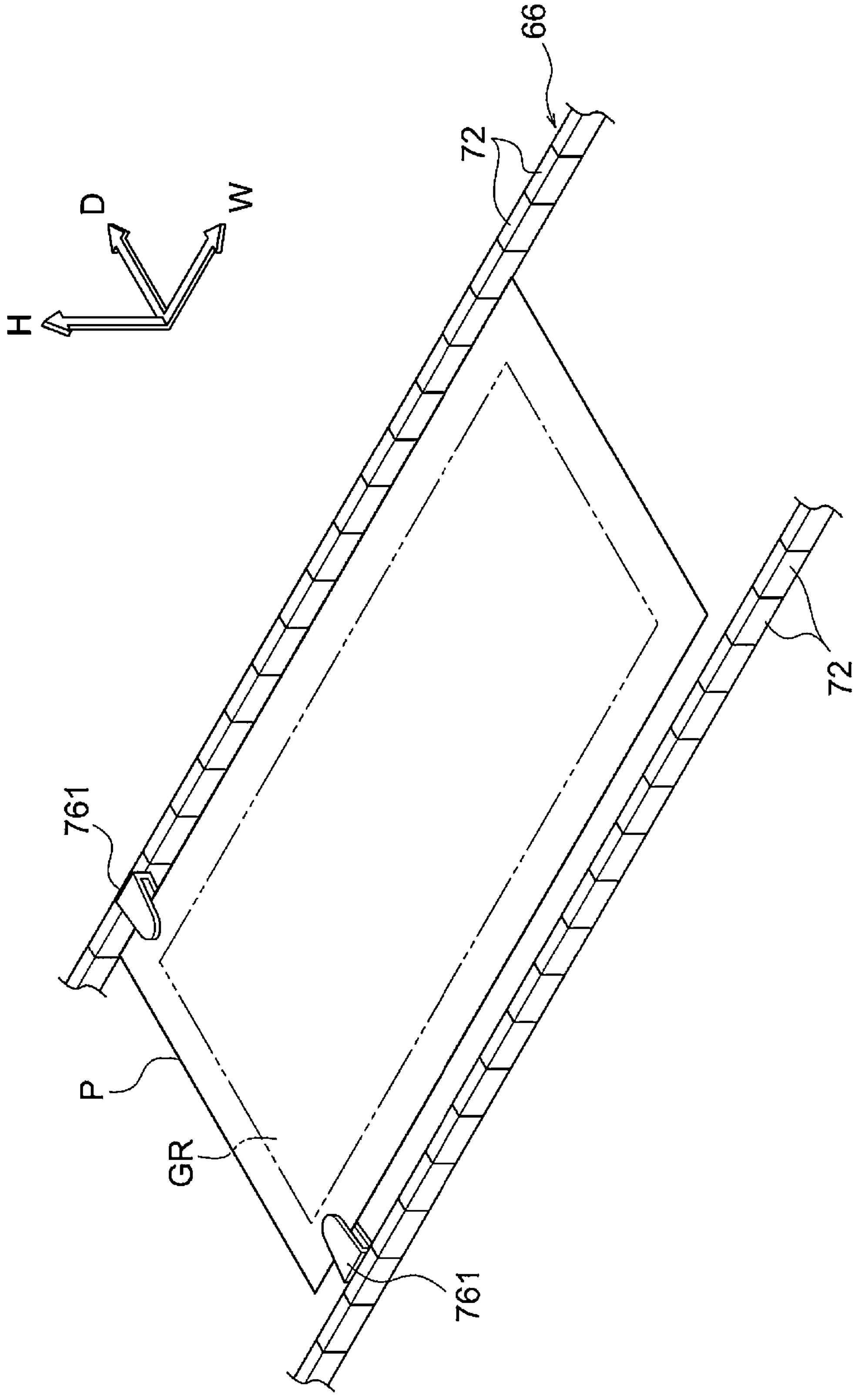
FIG. 7 is a perspective view illustrating a modification of a chain gripper.

Although the grippers 76 disposed on a downstream side relative to the paper P in the transport direction hold the front end portion of the paper P from the downstream side in the transport direction of the paper P in the chain gripper 66 in the present exemplary embodiment, this is not restrictive. As an example of the holding part, grippers 761 that are disposed beside both side edges of the paper P and hold front-end side edge portions of the paper P from sides besides the side edges may be used, as illustrated in FIG. 7.

Other Modifications

Although the paper P is used as an example of a recording medium in the present exemplary embodiment, this is not restrictive. The recording medium may be, for example, a film, and the recording medium may be, for example, a sheet member having a sheet shape (paper shape, film shape) other than the paper P.

Although the image forming part 12 has the transfer belt 31 as an intermediate transfer body in the present exemplary embodiment, this is not restrictive. The image forming part may be, for example, a direct-transfer-type image forming part. The image forming part may be, for example, an inkjet-type image forming part that forms an image by ejecting ink toward the paper P.

Although the transport body is the opposed roll 36 of the transfer part 35 in the present exemplary embodiment, this is not restrictive. The opposed roll 36 may be a support roll or a support block that supports the rear surface PB of the paper P transported from the transfer part 35. In this case, it is more desirable that the support roll be disposed so as to support the paper P that is being sandwiched by the transfer part 35. Furthermore, it is desirable that the front surface of the paper P does not make contact with another member until the paper P reaches the heating part 102 after leaving the transfer part 35 or until the paper P reaches the fixing unit 120 after leaving the transfer part 35.

Although the separation position 36X is located on a downstream side relative to the second transfer position NT in the present exemplary embodiment, this is not restrictive. For example, the separation position 36X may be located at a downstream end of the second transfer position NT. That is, the rear end of the paper P may be separated from the opposed roll 36 when the rear end of the paper P finishes passing the second transfer position NT. In a case where an inkjet-type image forming part or the like is used as an example of the image forming part, the second transfer position NT (sandwiching position) is not present, and the rear end of the paper P is separated from the opposed roll 36 without sandwiching the paper P disposed on the outer circumferential surface of the opposed roll 36.

Although the air blowing mechanism 170 includes the air blowers 160 and the ventilation plate 180 in the present exemplary embodiment, this is not restrictive. The air blowing mechanism 170 may include only the air blowers 160 without including the ventilation plate 180.

Although the air blowing mechanism 170 starts support of the rear surface PB by blown air before the rear end of the paper P finishes passing the second transfer position NT in the present exemplary embodiment, this is not restrictive. The air blowing mechanism 170 may start support of the rear surface PB by blown air after the rear end of the paper P finishes passing the second transfer position NT as long as the support of the rear surface PB is started before the rear end of the paper P is separated from the opposed roll 36. Alternatively, air blowing may be started before the paper P enters the second transfer position NT during image formation or air blowing may be always performed during image formation.

Although the air blowing mechanism 170 supports the rear surface PB on a rear end side relative to the holding position at which the chain gripper 66 holds the paper P in the present exemplary embodiment, this is not restrictive. For example, in a case where the chain gripper 66 holds a position in a front end side portion of the paper P close to a center in the transport direction, the air blowing mechanism 170 may support the rear surface PB at a same position as the holding position at which the chain gripper 66 holds the paper P.

Although the air blowing mechanism 170 supports the rear surface PB of the paper P in a non-contact manner in the present exemplary embodiment, this is not restrictive. For example, the support part may support the recording medium while making contact with the rear surface PB of the paper P.

Although the rear surface PB of the paper P is supported by blown air in the present exemplary embodiment, this is not restrictive. For example, the support part may support the rear surface PB of the paper P in a non-contact manner by magnetic force or electrostatic force.

Although the air blowers 160 blow air toward the rear surface PB of the paper Pin a thickness direction of the paper P in the present exemplary embodiment, this is not restrictive. For example, the air blowers 160 may blow air obliquely with respect to the thickness direction of the paper P. For example, the air blowers 160 blow air toward the rear surface PB of the paper P obliquely toward an upstream side in the transport direction of the paper P (toward an upper right side in FIG. 3).

Figure 8:
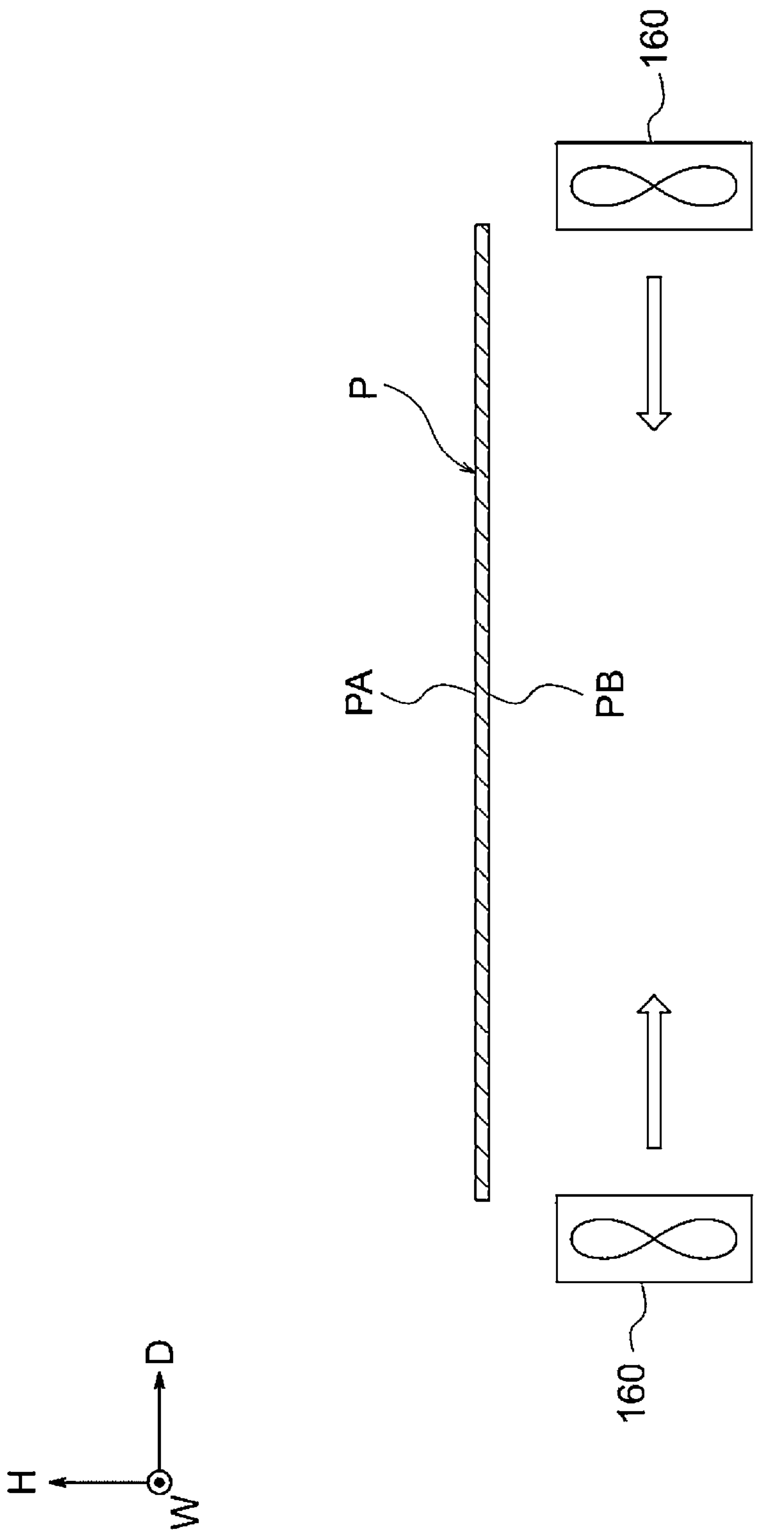
FIG. 8 is a side view illustrating a modification of air blowers.

Furthermore, as illustrated in FIG. 8, the air blowers 160 may be disposed outside the paper P in the width direction, and the air blowers 160 may blow air toward the rear surface PB of the paper P from sides beside both side edges of the paper P. In other words, any configuration may be employed as long as air is supplied to the rear surface PB of the paper P so that the paper P floats up.

Although air is supplied only to the rear surface PB of the paper P in the present exemplary embodiment, this is not restrictive. Supplying air to the front surface PA of the paper P may be permitted from the following perspectives.

Figure 9:
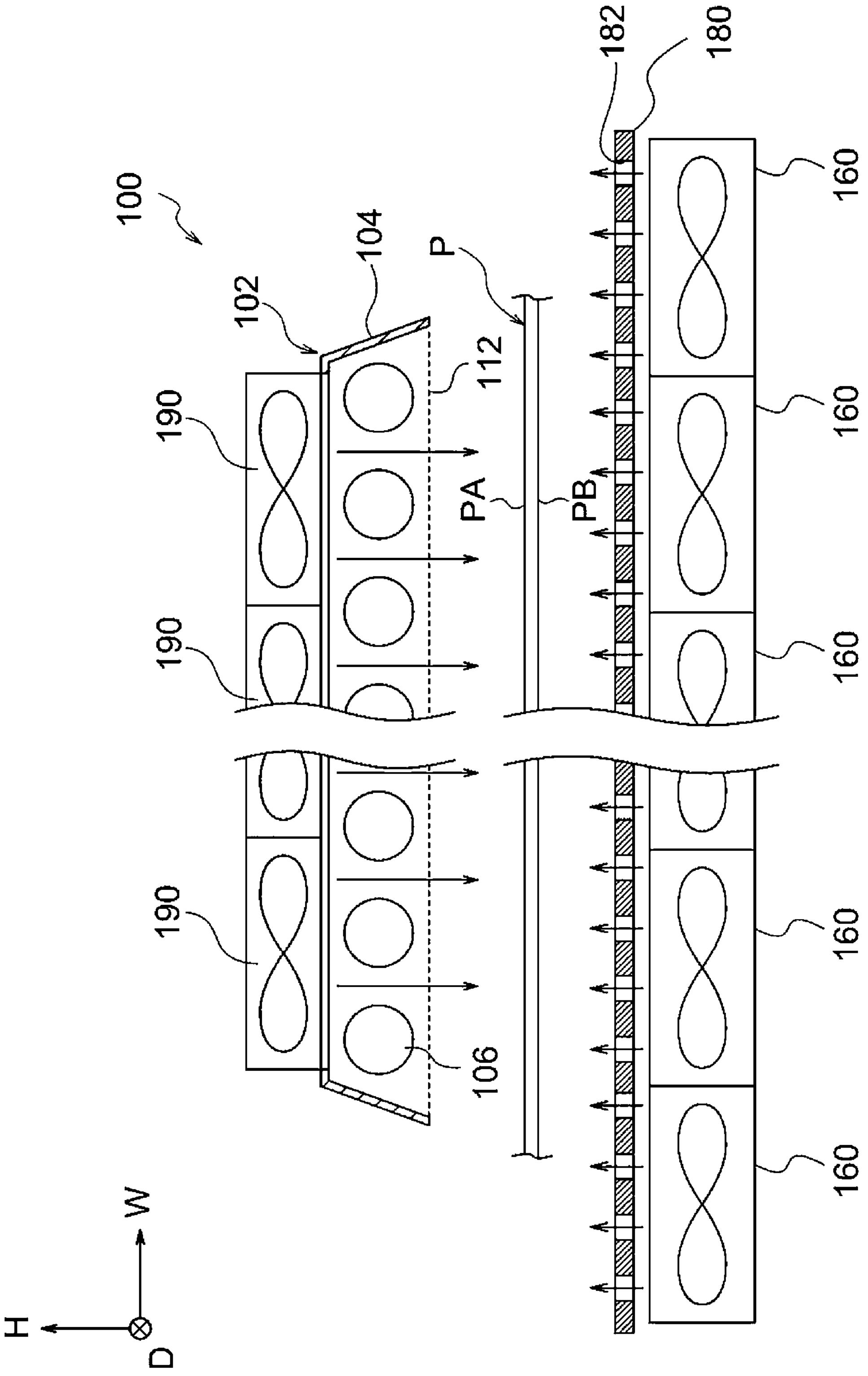
FIG. 9 is a schematic view illustrating a configuration of Modification 1.

The example illustrated in FIG. 9 is Modification 1 in which air is supplied to the front surface PA from a perspective of stable transport of the paper P. In Modification 1, air blowers 190 that is disposed so as to face the front surface PA of the paper P and supply air to the front surface PA are provided in addition to the configuration according to the present exemplary embodiment illustrated in FIG. 3. A posture of the paper P is kept in parallel with the transport direction by adjusting a relative air volume between air blown from the air blowers 190 and air blown from the air blowers 160. In this case, from a perspective of using dry toner, an air volume of the air blowers 190 is set smaller than an air volume of the air blowers 160 and is set to such a degree that toner is not scattered by air from the air blowers 190.

Figure 10:
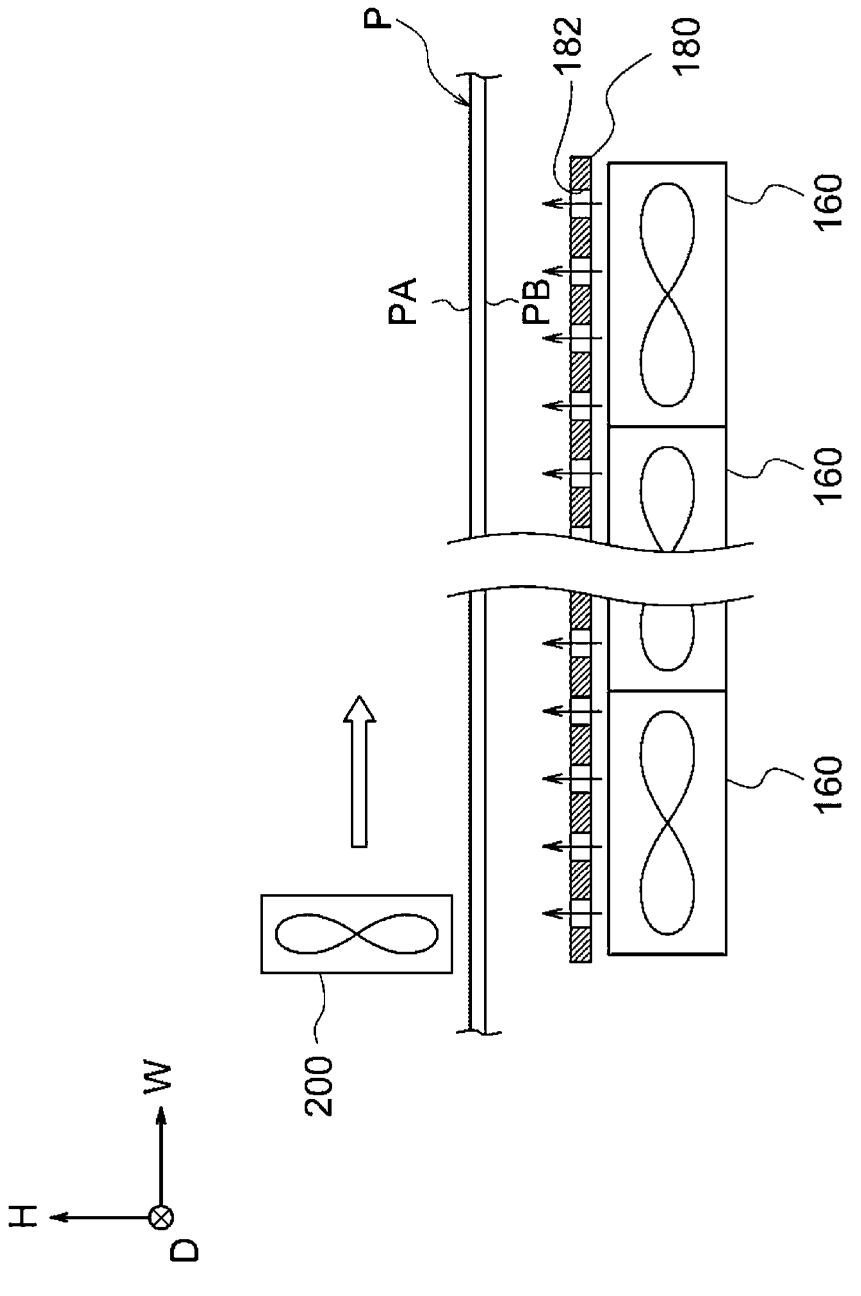
FIG. 10 is a schematic view illustrating a configuration of Modification 2.

In Modification 2 illustrated in FIG. 10, an air blower 200 for ventilating a surrounding region of the heating part 102 is provided so as to face a direction orthogonal to the air blowing direction of the air blowers 160. That is, an air outlet of the air blower 200 is opened in a direction along the front surface PA of the paper P and does not face the front surface PA of the paper P. Air blown from the air blower 200 flows in the direction along the front surface PA of the paper P, and air from the air blower 200 may be supplied to the front surface PA of the paper P. Also in this case, it is desirable that an air amount is set to such a degree that toner is not scattered, as in Modification 1.

In the present exemplary embodiment, an aspect in which the air blowers 160 blow air toward the rear surface PB of the paper P in the thickness direction of the paper P has been described. When the air blowers 160 blow air in a case where no recording medium is present between the heating part 102 and the air blowers 160, heated air around the heating part 102 may undesirably diffuse in the apparatus. In a case where the air blowers 160 are configured to blow air at a timing at which a recording medium faces the air blowers 160 as a countermeasure for this, blown air is blocked by the recording medium. In other words, by weakening or stopping air blowing between a preceding recording medium and a following recording medium, air supplied from the air blowers 160 to the heating part 102 is reduced, and as a result, diffusion of warmed air in the apparatus is suppressed. Driving of the air blowers 160 may be thus controlled, and driving of the plural air blowers 160 may be individually controlled.

The present disclosure is not limited to the above exemplary embodiment, and can be modified, changed, and improved in various ways without departing from the spirit of the present disclosure. For example, the above modifications may be combined as appropriate. The present application is based on Japanese Patent Application No. 2020-155743 filed on Sep. 16, 2020, contents of which are hereby incorporated by reference.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:

a gripper that transports a recording medium while holding a front end side of the recording medium in a transport direction;

a roller that transports the recording medium with the recording medium being supported at a transfer position; and a blower that performs air blowing to support the recording medium, wherein the gripper, the roller, and the blower support the recording medium before the recording medium is separated from the roller due to transport by the gripper, the gripper and the blower support the recording medium after the recording medium is separated from the roller due to transport by the gripper, and the blower starts the air blowing before a rear end of the recording medium finishes passing a sandwiching position where the recording medium is sandwiched between the roller and a transfer belt.

2. The image forming apparatus according to claim 1, further comprising:

a non-contact heater located downstream of the roller, wherein the blower performs the air blowing even after the recording medium passes a heating region of the heater.

3. A method of controlling an image forming apparatus, the image forming apparatus including a gripper that transports a recording medium while holding a front end side of the recording medium in a transport direction, a roller that transports the recording medium with the recording medium being supported at a transfer position, and a blower that performs air blowing to support the recording medium, wherein the method comprises:

controlling the gripper, the roller, and the blower to support the recording medium before the recording medium is separated from the roller due to transport by the gripper, controlling the gripper and the blower to support the recording medium after the recording medium is separated from the roller due to transport by the gripper, and controlling the blower to start the air blowing before a rear end of the recording medium finishes passing a sandwiching position where the recording medium is sandwiched between the roller and a transfer belt.

4. The method according to claim 3, wherein a non-contact heater is located downstream of the roller, and the method further comprises controlling the blower to perform the air blowing even after the recording medium passes a heating region of the heater.

* * * * *